(12) United States Patent
Hao

(10) Patent No.: US 6,703,602 B1
(45) Date of Patent: Mar. 9, 2004

(54) OPTICAL ENCODER WITH AT LEAST ONE LENTICULAR SHEET

(75) Inventor: Pat Sin Hao, 908-30 Higa Street East, Mississauga, Ontario (CA), L5G-1J8

(73) Assignee: Pat Sin Hao, Toronto (CA)

( * ) Notice: Subject to any disclaimer, the term of this patent is extended or adjusted under 35 U.S.C. 154(b) by 0 days.

(21) Appl. No.: 09/529,832

(22) PCT Filed: Oct. 20, 1998

(86) PCT No.: PCT/CA98/00977

§ 371 (c)(1),
(2), (4) Date: Apr. 19, 2000

(87) PCT Pub. No.: WO99/20976

PCT Pub. Date: Apr. 29, 1999

(30) Foreign Application Priority Data

Oct. 20, 1997 (CA) ................................................ 2214193

(51) Int. Cl.[7] ................................................ G01D 5/347
(52) U.S. Cl. .......................... 250/231.18; 250/231.13; 250/237 R
(58) Field of Search .............. 250/216, 237 G, 250/237 R, 234, 231.13, 231.14, 231.16, 231.17, 237.18, 559.29, 559.32; 359/618, 619, 621, 622, 624, 626

(56) References Cited

U.S. PATENT DOCUMENTS

| | | | | |
|---|---|---|---|---|
| 3,770,970 A | * | 11/1973 | Trump ................... 250/231 SE |
| 5,424,553 A | * | 6/1995 | Morton ................... 250/548 |
| 5,479,026 A | * | 12/1995 | Schumtz et al. ............ 250/568 |
| 5,559,599 A | * | 9/1996 | Michel ................... 356/356 |
| 5,977,539 A | * | 11/1999 | Holzapfel et al. ...... 250/237 G |
| 6,060,720 A | * | 5/2000 | Gudelhus ............... 250/559.29 |
| 6,194,708 B1 | * | 2/2001 | Wang et al. ........... 250/231.13 |

* cited by examiner

Primary Examiner—David V. Bruce
Assistant Examiner—Hoon Song
(74) Attorney, Agent, or Firm—Pat Sin Hao

(57) ABSTRACT

An optical encoder comprising a light source (12) emitting a light beam, a first lenticular array (14) to which the light beam is directed, a second movable lenticular array (16) to which the light beam exiting from the first lenticular array is directed and a light receiving element (18). The individual lenslets in the first and the second lenticular array refract the light beam into fine beams of periodic pattern or dark and bright fringes. As the movable lenticular array is being displaced in a direction parallel to the first lenticular array, the incident angle of the light beam exiting from the first lenticular array to the second lenticular array is changed, which results in a change in the position of the periodic pattern. Thus, as the position of the periodic pattern is changing, the output of the light receiving element varies accordingly and may readily be converted to a digital signal indicative of the position and direction of the movable lenticular array.

21 Claims, 13 Drawing Sheets

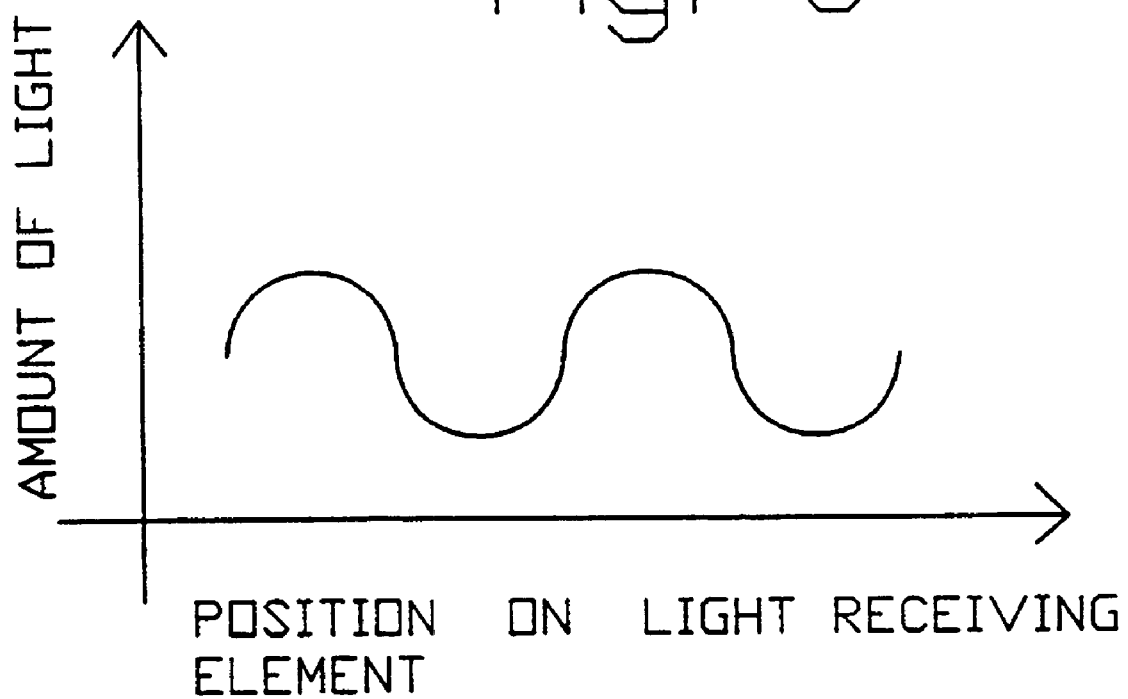

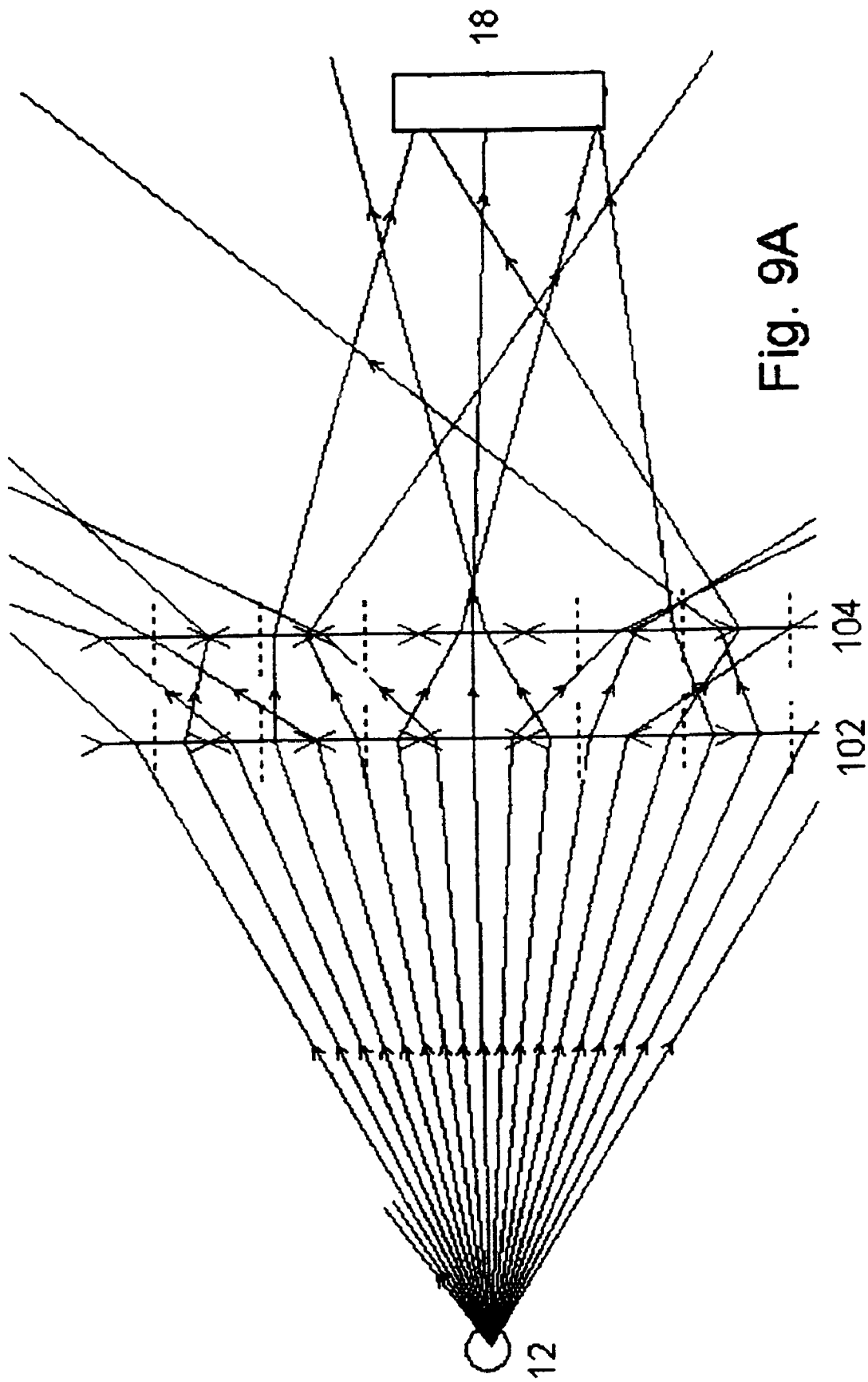

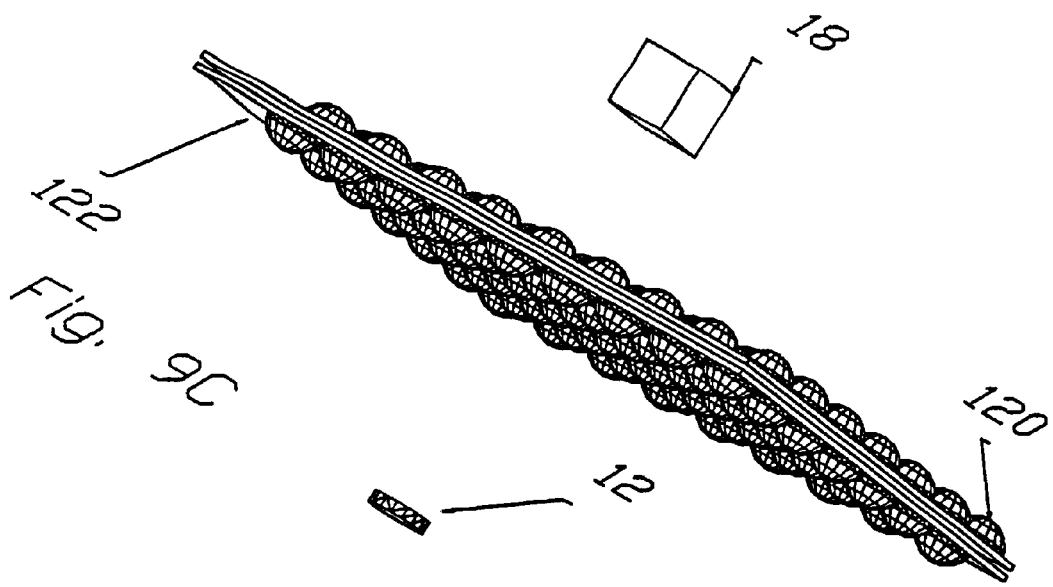
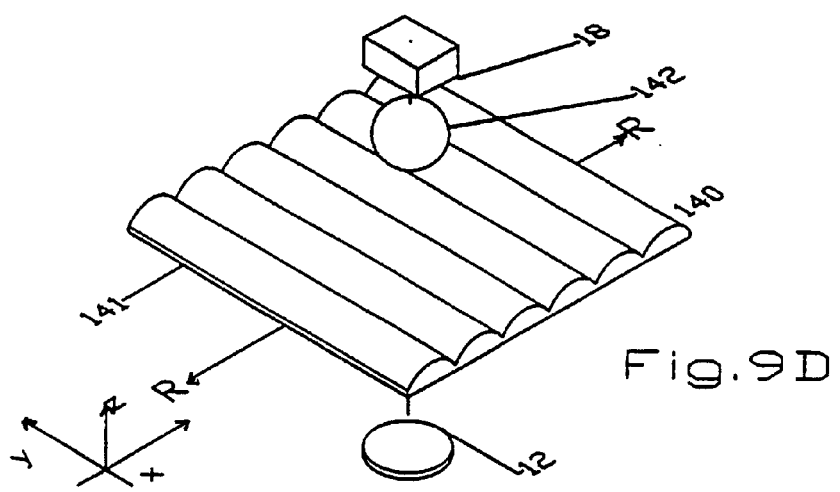

OPTICAL ENCODER WITH AT LEAST ONE LENTICULAR SHEET

FIELD OF THE INVENTION

The present invention relates to an optical encoder used for measuring a displacement of a movable member, such as an optical shaft angle encoder or a position sensor.

BACKGROUND OF THE INVENTION

Various types of optical encoders that are used to resolve the position and the movement of an object are known. FIG. 1 illustrates an example of an optical encoder disclosed in a German Laid-Open Patent Application (DE A1) No.2,316, 248. The optical encoder comprises a light source 200, a lens 202 which collimates a light beam from the light source 200, a first fixed diffraction grating 204 and a second movable diffraction grating 206, a condenser lens 208 and light receiving elements 210, 212 and 214. The collimated light source 200 is incident on the first fixed diffraction grating 204 and then to a second movable diffraction grating 206. As the movable diffraction grating 206 is displaced in the direction indicated by an arrow R, the interference fringes are moved on the light receiving elements 210, 212, 214 via the condenser lens 208, resulting in a sinusoidal change in the amount of light received by the light receiving element 210, 212 and 214. Thus, if the movable diffraction grating 206 moves a single pitch of the grating, the level of output from the light receiving elements 210, 212, 214 varies like a single period of sine wave. By sensing this change, the amount of displacement of the movable diffraction grating 206 can be determined.

Another typical optical encoder which is illustrated in FIG. 2 uses a shaft encoder 300 which includes an encoding wheel 302 having plurality of slits 304 therein. A light source 306 is positioned on one side of the encoding wheel 302, while a photosensor 308, such as a phototransistor, is positioned on the other side of the encoding wheel 302 opposite to the light source 306. The rotation of the encoding wheel 302 therebetween generate a series of light pulses to be received by the photosensor 308, by which the displacement of the encoding shaft 300 can be measured.

Although such a prior art approach has worked well depending on the measuring apparatus and the precision required, the optical encoder which use diffraction gratings offers high resolution, but also expensive to manufacture and relatively complex in their design compare to the encoder wheel. However, the low cost and simplicity the encoding wheel does not generate a very high resolution that is required by some devices, there is an upper limit on the number of slits that can be incorporated in an encoding wheel.

Thus, it is desirable to provide an optical encoder apparatus that produces high resolution, low cost of manufacturing and simple in design.

SUMMARY OF THE INVENTION

It is a primary objective of this invention to provide an optical encoder in which the aforementioned disadvantages are eliminated.

Another object of the present invention is to provide a simple optical encoder without using a collimating lens.

Yet another object is to provide an optical encoder having components which can be easily manufacture.

Yet another object is to provide an optical encoder in which a light source having a wide light-emitting surface can be use.

Yet another object of the present invention is to provide a two dimensional optical encoder.

Yet another object is to provide an optical encoder that applies over a large surface area.

According to one aspect of the present invention, an optical encoder comprising:

a light source emitting a light beam;

a first array of lenslets to which the light beams is directed;

a second array of lenslets or lens to which the light beams exiting from the first array of lenslets are directed; and a means for obtaining the displacement information of one of the first or second array of lenslets is being displaced. The displacement information is obtained by the changing position of the dark and bright patterns generated by the individual lenslets, which define the light beam into fine beams of periodic pattern or dark and bright fringes as the light beam pass through the first and second array of lenslets.

Additionally, applying the same principle can create a two-dimensional optical encoder. The method is to superpose two array of lenslets, the arrays of lenslets are arranged in such a manner that the longitudinal axis of the lenslets are perpendicular to each other. Thus, the light beam that is being defined by the first layer composes of arrays of lenslets superpose perpendicularly and the exiting beam is then directed to a second similar layer which defines the light beam into two sets of dark and bright fringes. Thus generating a two dimensional optical encoder.

Another feature of the present invention is that array of lenslets can be manufactured quite economically in a large array size. Thus, the present invention is ideal for applications that require an optical encoder that covers a large surface area. An example of such application is an optical pen or mouse.

According to another aspect of the present invention, an optical encoder comprising:

a light source emitting a light beam;

a movable lenticular array to which the light beams is directed. The light beam passes through each individual lenslets which defines the light beam into a fine beam of periodic pattern;

a means for detecting the light pattern and measuring the output signal as the lenticular array is being displaced.

Similarly, a two-dimensional optical encoder can be obtained by superposing two lenticular arrays having the longitudinal axis of the lenslets arrange perpendicularly to each other.

The foregoing and other objects, features and advantages of the present invention will become more readily apparent from the following detailed description of a preferred embodiment, which proceeds with reference to the drawings.

DESCRIPTION OF THE DRAWING

FIG. 5 is graph showing the amount of light received by the light receiving element as the position of the movable array of lenslets is being displaced;

DETAIL DESCRIPTION OF THE PREFER EMBODIMENT

A detail description will now be given, with reference to FIG. 3, which illustrates the first embodiment of an optical encoder according to the present invention.

Figure 1:
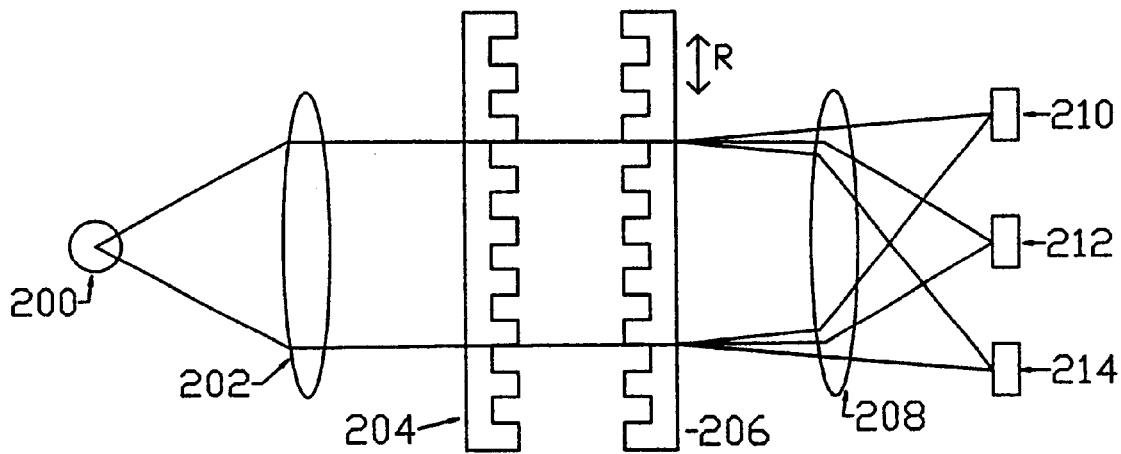
FIGS. 1–2 illustrates the prior art optical encoder.
Figure 2:
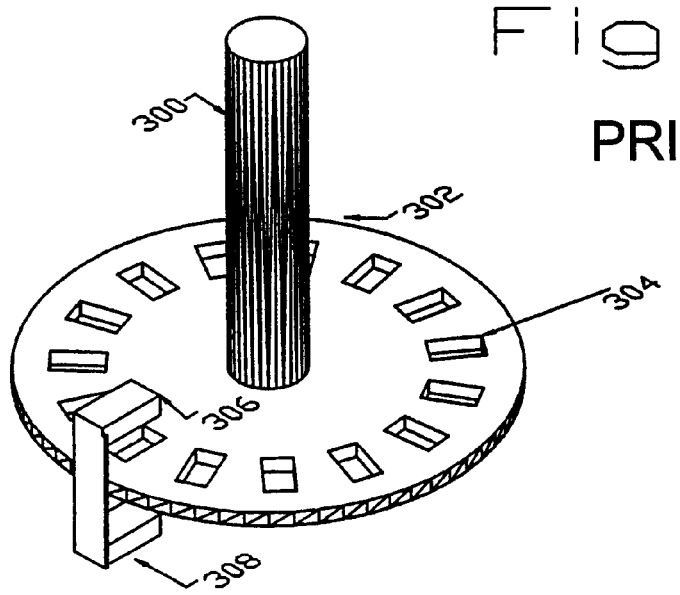
Figure 3:
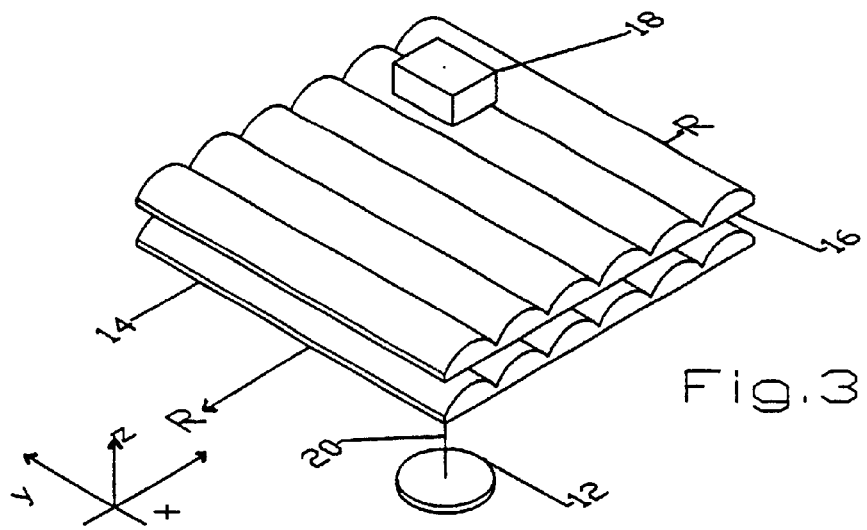
FIG. 3 illustrates the first embodiment of an optical encoder according to the present invention.

The optical encoder shown in FIG. 3 comprises a light source 12, a first and second array of lenslets 14 and 16 on which the light beam 20 is incident and a displacement information obtaining means 18.

Figure 4:
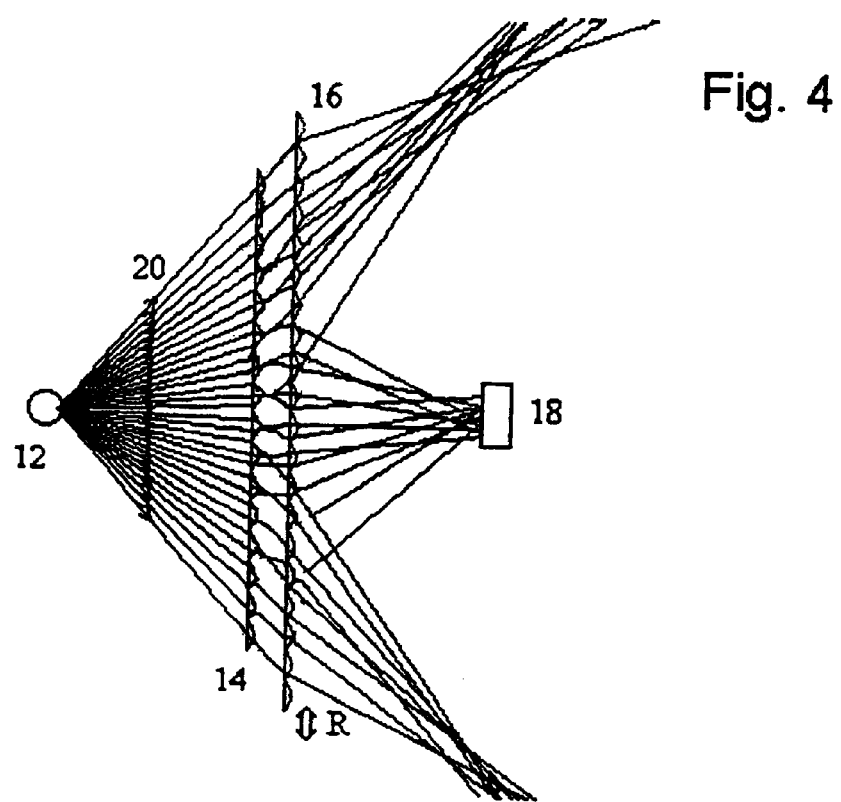
FIG. 4 represents a cross-sectional view along the line R—R of FIG. 3.
Figure 4A:
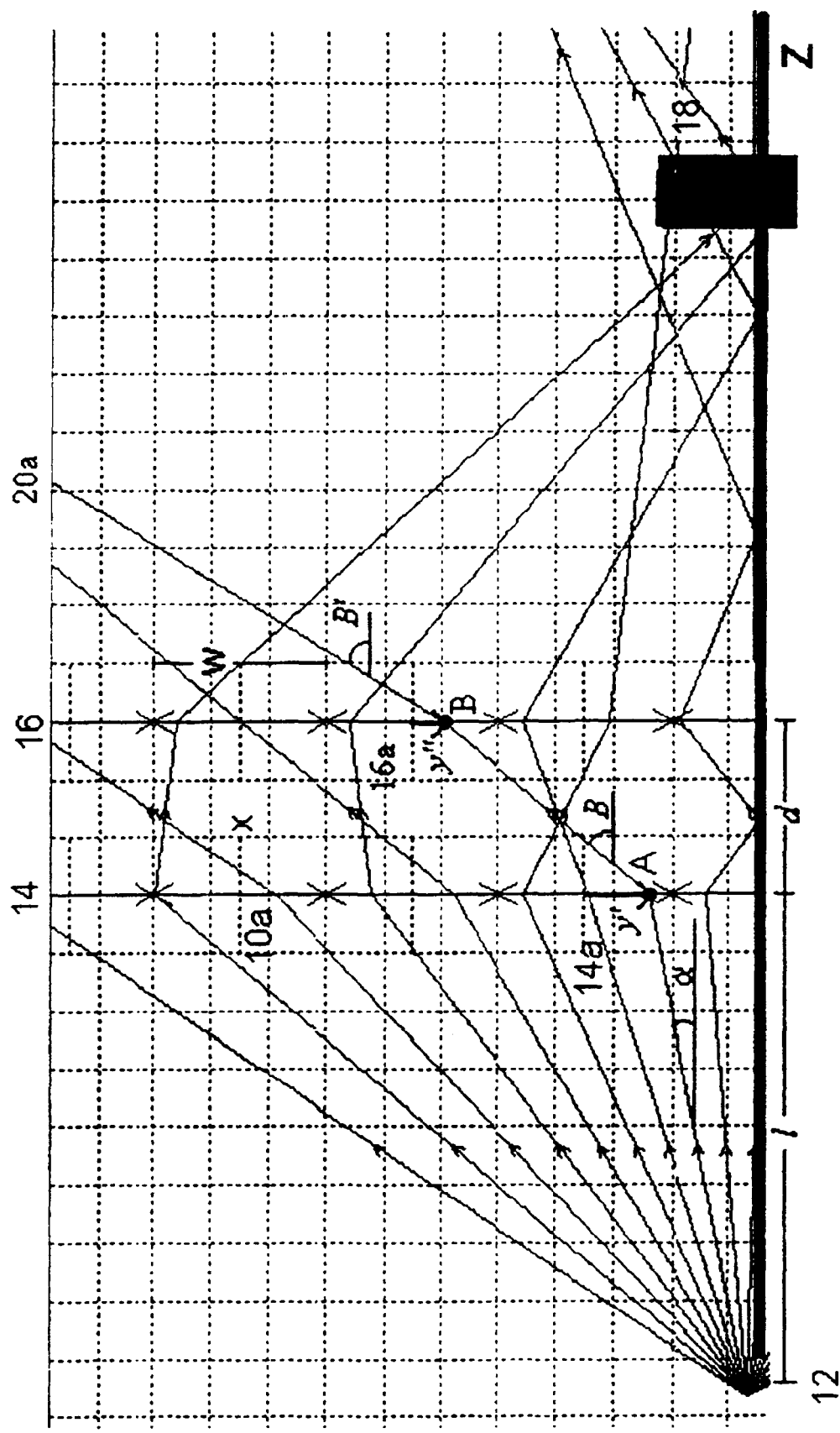
FIGS. 4A–C is a detail description of the operation the first embodiment shown in FIG. 3.
Figure 4B:
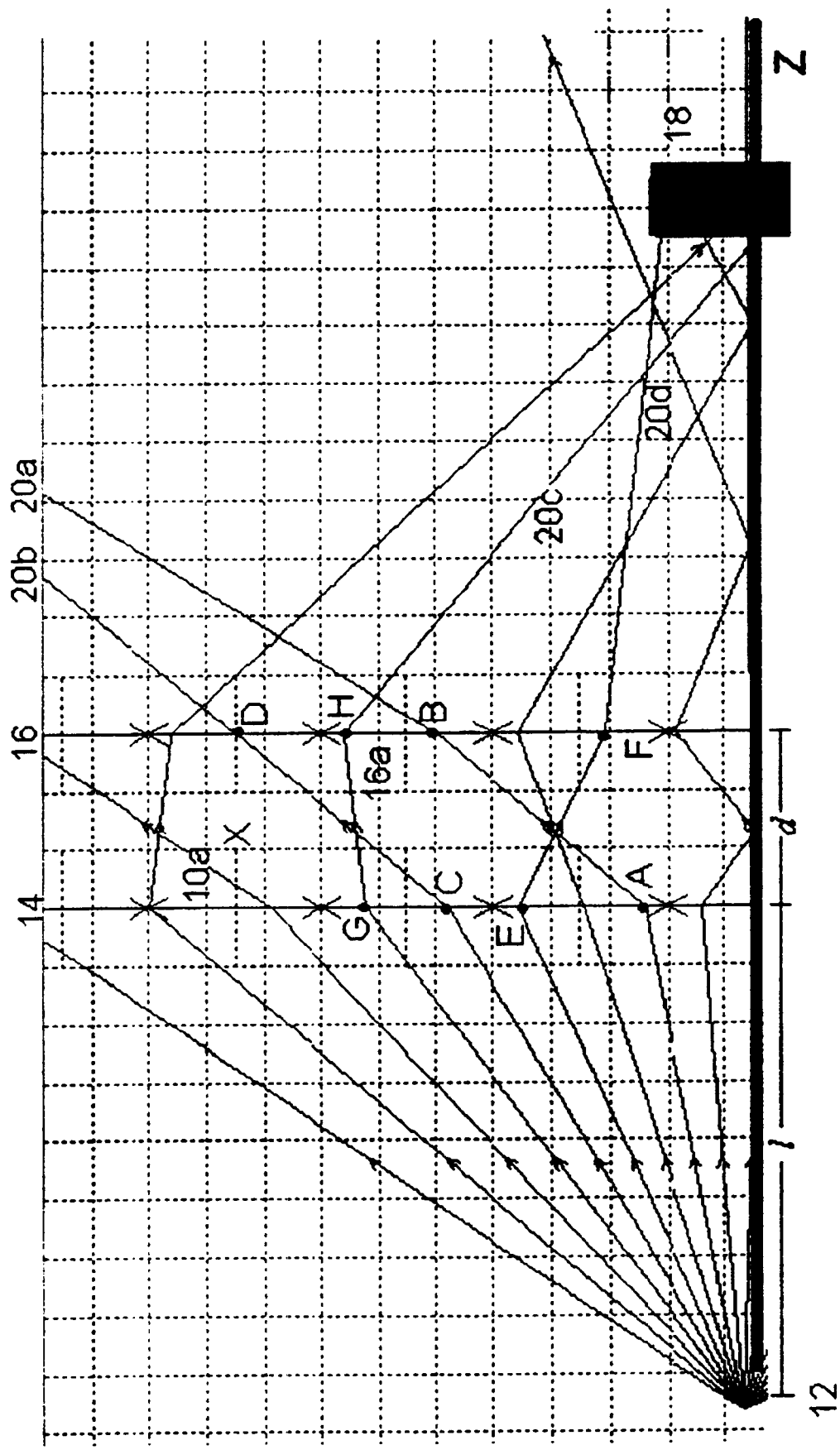
Figure 4C:
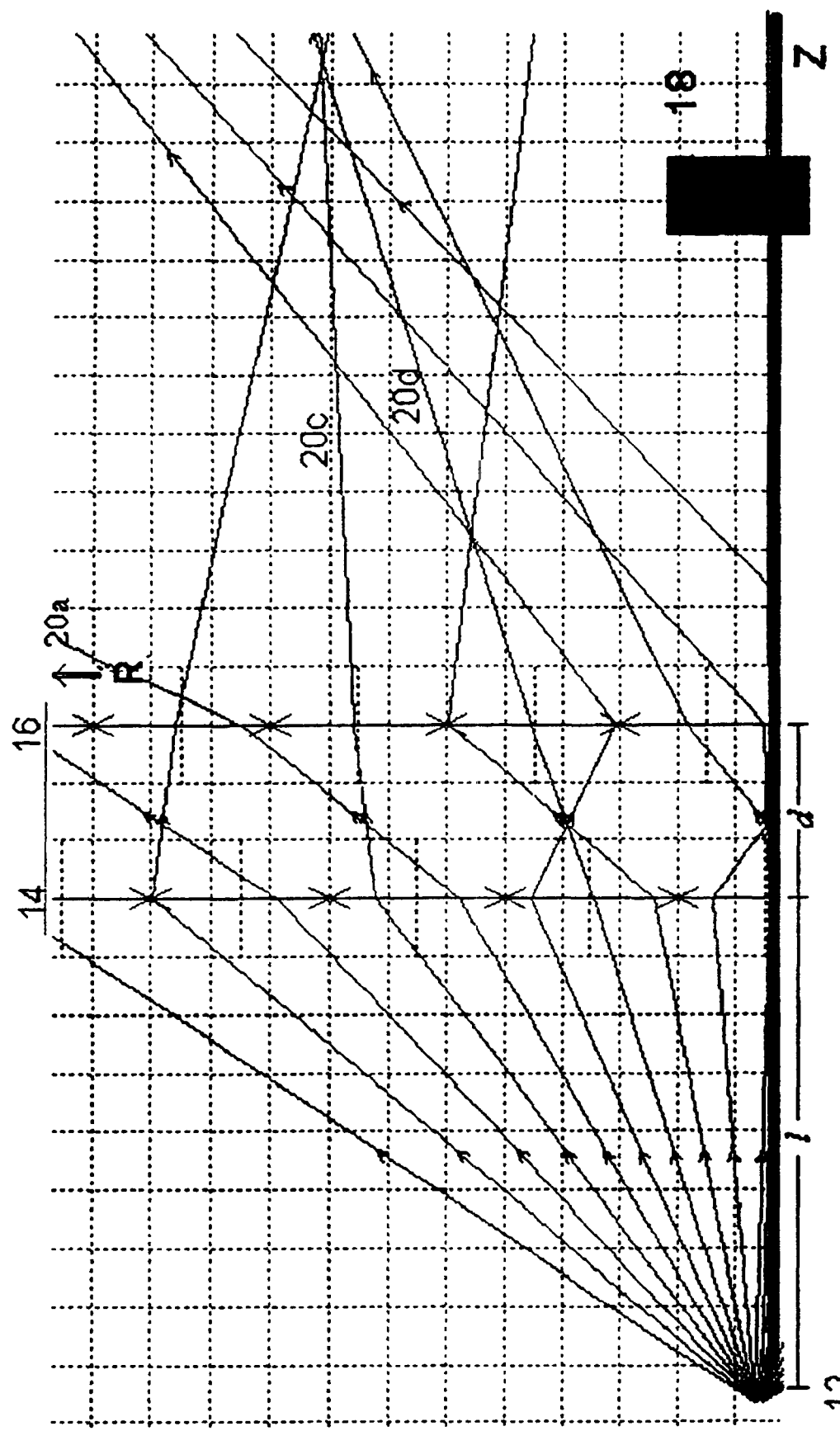

Referring now to the diagrammatic view of FIGS. 4–4C for an understanding of the operation of the first embodiment of present invention. FIG. 4 illustrates a cross-sectional view along the line R—R of FIG. 3. The first array of lenslets 14 is parallel to the second array of lenslets 16. The first array of lenslets is fixed and the second array of lenslets is movable in the direction indicated by an arrow R. In the greatly enlarged views of FIG. 4A, the structure of the arrays of lenslets 14 and 16 may be seen to be comprised of arrays of thin convex lenslets 10a. In this particular illustration of the first embodiment of the present invention, the lenslets are considered to be thin lens since the width W of the lens is much greater than the thickness of the lens. However, it should be understood that the lenslets can be compose of thick or thin convex or concave or cylindrical or spherical lens or can be of more complex optical system and imaging element, such as hologram and other diffractive lens. FIG. 4A illustrates the principle of operation of the first embodiment of the present invention using Paraxial optics. Paraxial optics is used to determine the angle of refraction and size of the light beam 20 after being refracted by the arrays of lenslets 14 and 16. The paraxial quantities provide information about ideal image formation in the selected set of coordinate. It will be seen later that the paraxial quantities serve as a basis for the actual ray paths through the optical system. The paraxial equation for a ray that passes though a lens can be described by the following expression:

$$\begin{bmatrix} I \\ B \end{bmatrix} = MTL \begin{bmatrix} y \\ \alpha \end{bmatrix} \quad (1.1)$$

Where α is the angle and y is the height of the incident ray relative to the optical axis Z, M is the refraction matrix, T is the matrix that transform y into the same optical axis X of the lenslet 10a, L is the translation matrix, I is the height and B is the angle of the refracted ray relative to the optical axis X of the lenslet 10a. Thus, the matrix equation for the thin convex lenslet 10a can be express as:

$$\begin{bmatrix} I \\ B \end{bmatrix} = \begin{bmatrix} 1 & 0 \\ -1/f & 1 \end{bmatrix} \begin{bmatrix} t & a \\ 0 & 1 \end{bmatrix} \begin{bmatrix} 1 & l \\ 0 & 1 \end{bmatrix} \begin{bmatrix} y \\ \alpha \end{bmatrix} \quad (1.2)$$

$$\begin{bmatrix} y' \\ \alpha \end{bmatrix} = \begin{bmatrix} t & a \\ 0 & 1 \end{bmatrix} \begin{bmatrix} 1 & l \\ 0 & 1 \end{bmatrix} \begin{bmatrix} y \\ \alpha \end{bmatrix} \quad (1.4)$$

To simplify the equation by:

$$\begin{bmatrix} I \\ B \end{bmatrix} = \begin{bmatrix} 1 & 0 \\ -1/f & 1 \end{bmatrix} \begin{bmatrix} y' \\ \alpha \end{bmatrix} \quad (1.5)$$

Which is equivalent to the algebraic equations $$I = y' \quad (1.6)$$

$$B = -y'/f + \alpha \quad (1.3)$$

From the equations 1.5 and 1.6 it is clear that for an incident ray with positive angle α, if y' is negative then the refraction angle B is greater than the incident angle α, which mean that the incident ray is being refracted away from the optical axis Z and if y' is positive and the refracted angle B is negative then the incident ray is being refracted toward the optical axis Z. By applying these equations to the incident ray 20a on FIG. 4A, it is possible to trace the incident ray 20a through the arrays of lenslets 14 and 16. At the point A, where the incident ray 20a meet the lenslet 14a, the equation 1.3 is used to calculate the translation of the incident ray 20a at a distance l from the first arrays of lenslets 14 and the height y' of the incident ray 20a. At the point A, y' is negative, the equation 1.4 shown that the incident ray 20a is being refracted away from the optical axis Z. Now to trace the ray 20a from point A to B, the same equations 1.3 and 1.4 is applied again, but now the reflected ray become the incident ray. Thus, substitute y with y' and α with B. Using the equation 1.3 to calculate the translation of the refracted ray 20a at a distance d from the first arrays of lenslets 14 to the second array of lenslets 16 and the height y" a point B. At point B, y" is negative, and again the equation 1.4 show that the ray 20a is further refracted from the optical axis Z. Now referring to FIG. 4B, using the same principle applied to the incident ray 20a to the incident rays 20b, 20c and 20d, it is possible to show that at the point D the incident ray 20b is being refracted away from the optical axis Z and at the point H and F the incident ray 20c and 20d is being refracted toward the optical axis Z and the light receiving element 18. Since all rays at substantially any given angle incident on the first and second arrays of lenslets 14 and 16 will either similarly refracted away from the optical axis Z, or similarly refracted toward the optical axis Z, which will generate dark and bright patterns. By displaying the second arrays of lenslets 16 in the direction indicated by an arrow R, the rays exiting from the first array of lenslets 14 is incident on the second movable array of lenslets 16 at a different position y". Using equation 1.3, y" change as the second array of lenslets is being displace in the direction indicated by an arrow R, which will result in a shift in the position of the dark and bright fringes as illustrated by the FIG. 4C. More specifically, if the movable second array of lenslets 16 moves a small distance corresponding to a single width W of a lenslet, the level of output from the light receiving element 18 varies like a single period of sine wave as shown in FIG. 5. By sensing this change, the amount of displacement of the movable array of lenslets 16 can be determined.

Additionally, the light receiving element 18 can be a CCD, photodetector, photodetector array, fiber optic or other light receiving mean for obtaining information of the changing light patterns. The output of the light receiving element 18 may then be converted to a analog or digital signal indicative of the position and direction of the movable array of lenslets 16 by a manner well know to the art.

Figure 7:
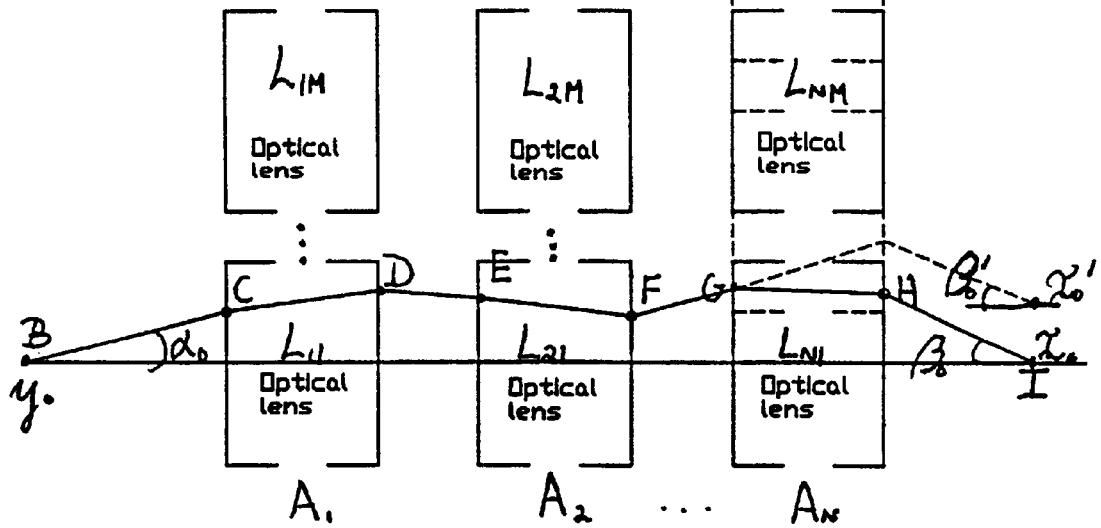
FIG. 7 is an illustration of the principle of operation of the present invention.
Figure 8:
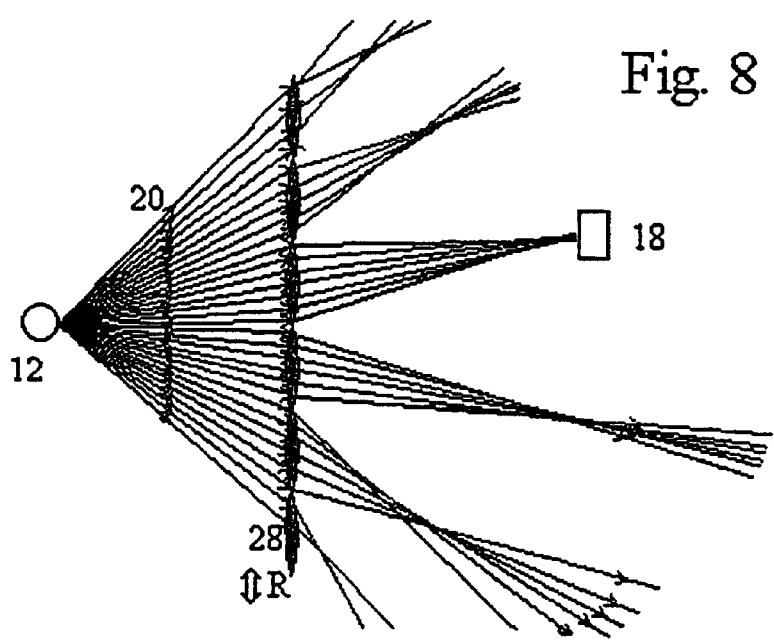
FIGS. 8, 9–9D illustrate the possible variations of the first embodiment shown if FIG. 3.

FIG. 7 is an illustration of a principle of an operation of the present invention. Any ray that passes through a lens, or through a combination of lenses, can be described by two parameters: by its direction $\alpha_0$, with respect to the axis Z, and by its height $y_0$ above the axis Z. As show in FIG. 7 each array of lenslets is represented by the letter A: $A_1$ represents the first array of lenslets, $A_2$ represents the second array of lenslets ... and $A_N$ represents the $N^{th}$ array of lenslets. Also, each lenslet in an array is treated as an optical lens and can be represented by the letter L: $L_{11}$ represent the first lenslets in first array $A_1$, $L_{12}$ represent the second lenslet in the first array $A_1$, ... and $L_{NM}$ represents the $M^{th}$ lenslet in the $N^{th}$ array. Moreover, each lenslet L can be further represented by four other matrix: $M_{111}$ is the matrix that transforms a paraxial ray relative to the optical axis Z into a paraxial ray relative to the optical axis of the lens $L_{11}$, $M_{112}$ represents a matrix of the first refraction surface of the optical lens $L_{11}$ at point B in FIG. 7, $M_{113}$ represents the translation matrix of the lens $L_{11}$ between point C and D, $M_{114}$ represents a matrix of the second refraction surface of the optical lens $L_{11}$ at point D. By combining matrices that represent individual lenslet, the position of an image of the ray starting from point B to I can be obtained by the following expressions.

$$L_{11}=M_{114}M_{113}M_{112}M_{11}, L_{21}=M_{214}M_{213}M_{212}M_{211}, \ldots L_{N1}=M_{N14}M_{N13}M_{N12}M_{N11}$$

$$\begin{bmatrix} B_0 \\ I_0 \end{bmatrix} = L_{NI} \ldots L_{21}L_{11}\begin{bmatrix} \alpha_0 \\ y_0 \end{bmatrix}$$

If the array of lenslets $A_N$ is displaced in the direction indicated by the arrow R, the Matrix $M_{N11} \ldots M_{NM1}$ are the only matrices that are being changed, since the position of the lenslet $L_{N1} \ldots L_{NM}$ are displaced. Thus $M_{N11}" \ldots M_{NM1}'$ represent the new matrices. Therefore, the equation to find the image of the ray can be obtained by the following expressions.

$$L_{11}=M_{114}M_{113}M_{112}M_{111}, L_{21}=M_{211}M_{213}M_{212}M_{211}, \ldots L_{N1}'=M_{N14}M_{N13}M_{N12}M_{N11}'$$

$$\begin{bmatrix} B_{0'} \\ I_{0'} \end{bmatrix} = L'_{NI} \ldots L_{21}L_{11}\begin{bmatrix} \alpha_0 \\ y_0 \end{bmatrix}$$

The matrix method lends itself to various computer techniques for tracing a ray through an optical system of arbitrary complexity. The above expressions make it possible to trace a ray and the image of a ray after an array of lenslets is being displaced. Thus, by combining the above equations with modern optics theory and computer programming, it is possible to design different type of arrays of lenslets such that when combine they will define light beam into dark and bright fringes.

As stated earlier paraxial optics is seen to describe the ray path through the lens for real rays in an ideal aberration-free imaging situation. Ray tracing is the best method used for a complete description of a ray path through an optical system. A light ray travels in a straight line until it encounters a surface, at which point its direction and in general its amplitude is changed and it proceeds further. If one know the shapes and positions of all of the optical surface, and specifies a bundle of rays coming from some object, one can develop a procedure to find the location and size of an image exactly. The procedure is to take each ray, find where it intersects the first surface and at what angle so that Snell's law can be applied to get the direction of the refracted ray and follow this new ray to the next surface, find the new intersection point and angle applied Snell's law, get the new direction of the refracted ray, et cetera, until the rays reach the final image. The theory for ray tracing can be obtained from a textbook on optics, such as Allen Nussbaum, "Optical System Design" and R. R. Shannon, "The Art and Science of Optical Design".

Figure 9:
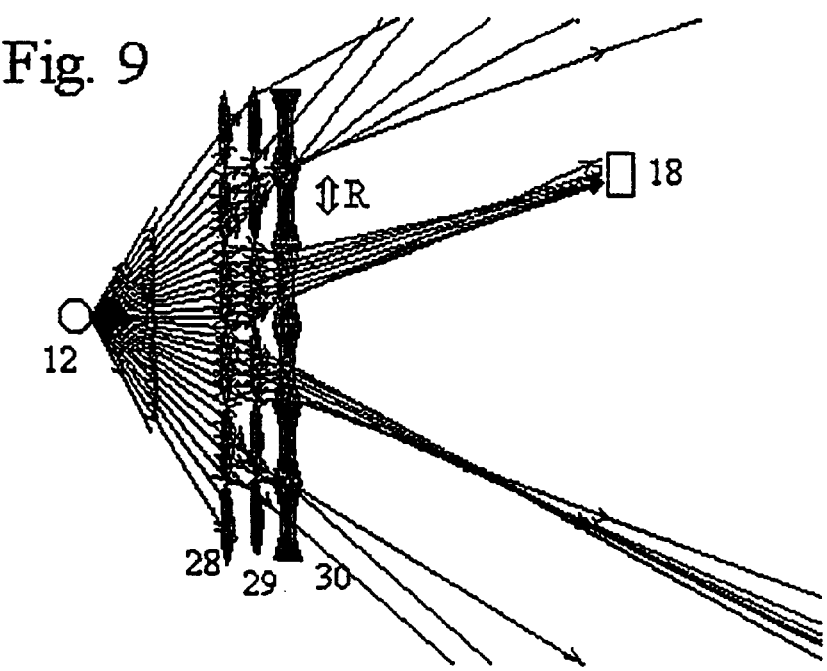
Figure 9B:
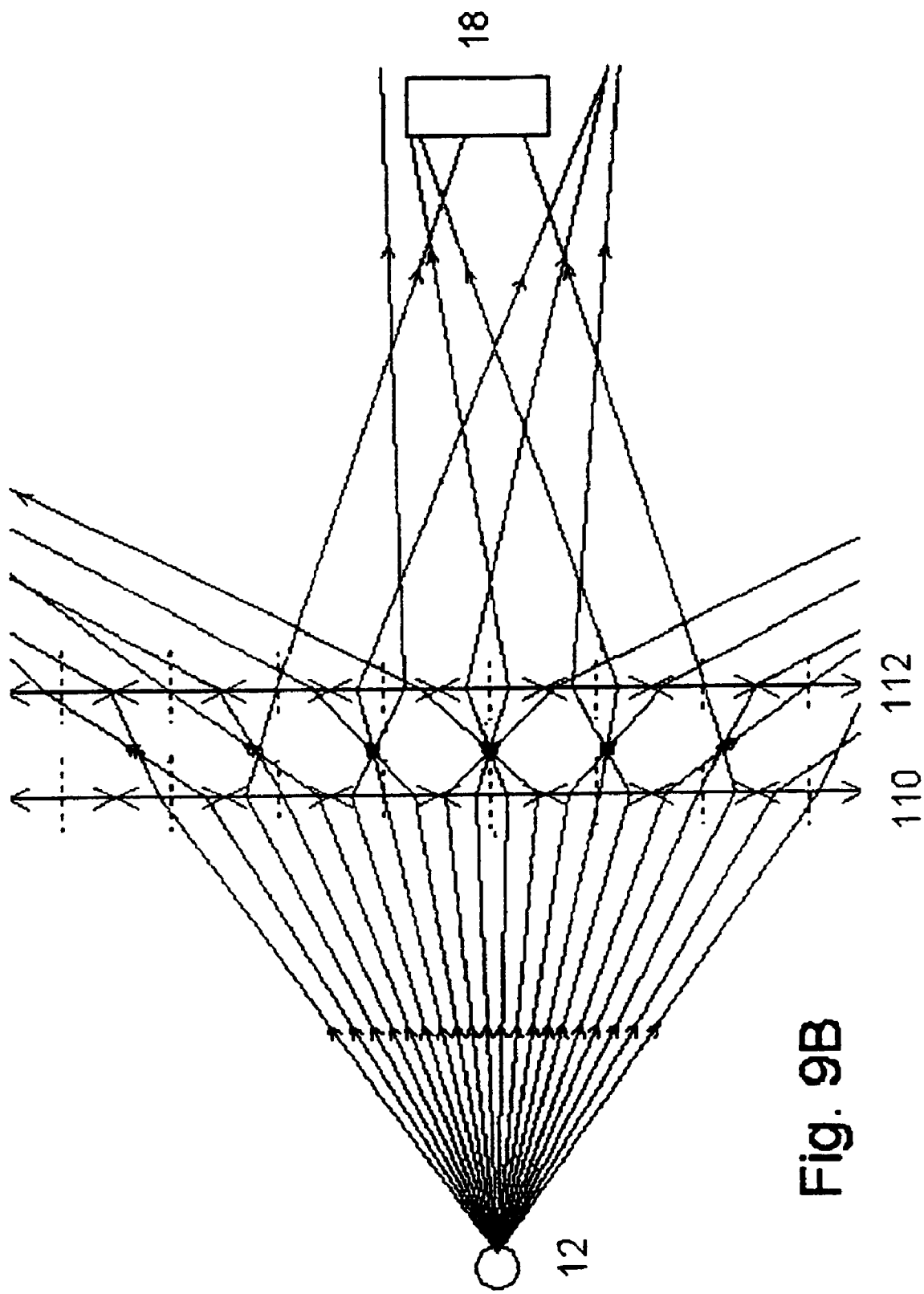

As an example of the application of the above mention principle of operation, FIG. 8, FIG. 9, FIG. 9A, FIG. 9B is a cross-section view of the variations of an optical encoder using different combination of arrays of lenslets to define light beam into dark and bright fringes by applying the principle described above. The optical encoder in FIG. 8 comprises a light source 12, a movable lenticular array having plurality of cylindrical lenses 28 and a light receiving element 18. FIG. 9 illustrates an optical encoder comprising a light source 12, a first and second lenticular array having plurality of cylindrical lenses 28 and 29, a movable lenticular array having plurality of biconcave lenses 30 and a light receiving element 18. FIG. 9A illustrates an optical encoder comprising a light source 12, a first and second lenticular array 102 and 104 and a light receiving element 18. The lenticular array 102 and 104 are composed of array of concave lenslets. FIG. 9B illustrates an optical encoder comprising a light source 12, a first and second movable lenticular array 110 and 112 and a light receiving element 18. The lenticular array 110 and 112 are composed of array of cylindrical lenslets.

FIG. 9C illustrates another example of an optical encoder comprises of a light source 12, a first and second movable lenticular array 120 and 122, each lenticular array are composed of plurality of spherical lenslets and a light receiving element 18. The phasing in and out of axial alignment of the spherical lenslets either focus the light ray or refract the light ray, which generate a Moiré like pattern. As the second movable array is being displaced the Moiré like pattern change. The optical effect creates by the superposition of the lenticular arrays 120 and 122 are disclosed in the U.S. Pat. No. 3,357,772 entitles "Phased Lenticular Sheets for Optical Effect". However, the application and the use of the lenticular sheets disclosed in the U.S. Pat. No. 3,357,772 are different and the lenticular sheet are not movable, but glue together to form a Moiré like pattern.

For optical encoder that comprises of two or more lenticular sheets, the distance between two lenticular sheets is quite important in obtaining a sharp pattern. For best result the distance that separate the two lenticular sheet should not be substantially more than three to four time the focal length of the lenslet. It has been found that a transparent coating on both side of the lenticular sheet can greatly enhance the optical pattern. For example, a clear epoxy coating employing a modified cycloaliphatic amine hardener and an epichlorohydrin and bisphenol—A product on both sides of the lenticular sheets has been found to provide good results with both cellulose propionate and polycarbonate lenticular sheet. Also, the distance that separates the two lenticular sheets can be made greater than four time the focal length of its lenslets by coating both side of the lenticular sheet.

The above mentioned lenticular sheets are generally manufactured by extrusion molding using thermoplastic resin. Beside glass, various synthetic plastic may be use for the plastic sheet material of the present invention, including acrylic acid esters and copolymers thereof, polystyrene, polycarbonates, cellulose nitrate, polypropylene and polyethylene. The manufacturing process of the lenticular is described in a Japanese Patent Application Laid-open No. Hei 3-200948 and Hei 2-146536. Because lenticular sheet can be manufacture inexpensively and the ability to produce lenticular lens having very fine pitch, such as more than 300 lines per inch, make it possible to fabricate inexpensive and high resolution optical encoder. Also, the clear plastic lenticular sheet allow the optical encoder to be used in conjunction with a mirror or reflective coating to create a reflective optical encoder.

Anyone skills in the art can create a program using the principle describe above that will simulate all the condition required to built a similar optical encoder to the present invention. Although, the first embodiment of the present invention only requires two arrays of lenslets, it can be easily deduced from the above principle and examples that any number of arrays of lenslets can be used, as long as at least one of the array of lenslets is a movable array. Moreover, lenslets of different sizes and shapes or of more complex optical system and imaging element, such as a hologram or other diffractive lens can be used as long as the combined optical system defines the light beam into dark and bright fringes.

Diffractive lens can be formed of a grating comprising plurality of line, either parallel or concentric which causes diffraction of incoming light to give the desire focusing effect. One such type of diffractive lens is described in the patent application of H. P. Kleinknecht, from United State with Ser. No. 754,134 entitled "Optical Imager With Diffractive Lenticular Array".

Another type of lenticular array can be in the form of a hologram. A hologram is generated by the interference pattern between coherent beam passing through a mask and a reference beam. Thus, a hologram having plurality of patterns or holographic array of lenslets that define light beam into dark and bright fringes can be used as the lenticular array.

Another embodiment of the present invention is illustrated in FIG. 9D. The optical encoder 140 comprises a light source 12, a lenticular array having plurality of cylindrical lenslet 141, a movable ball lens 142 and a movable light receiving element 18. As the ball lens 142 and light receiving element 18 are being displaced in the direction of the line indicated by R, the ball lens 142 either focus light rays onto the light receiving element 18 or scatter light ray away from the light receiving element 18.

Although, the above-mentioned embodiments are linear optical encoder due to the linear displacement of the movable array of lenslets 16, 28 or 30, a rotary or spherical optical encoder can also be formed using the principle of the present invention.

Figure 10:
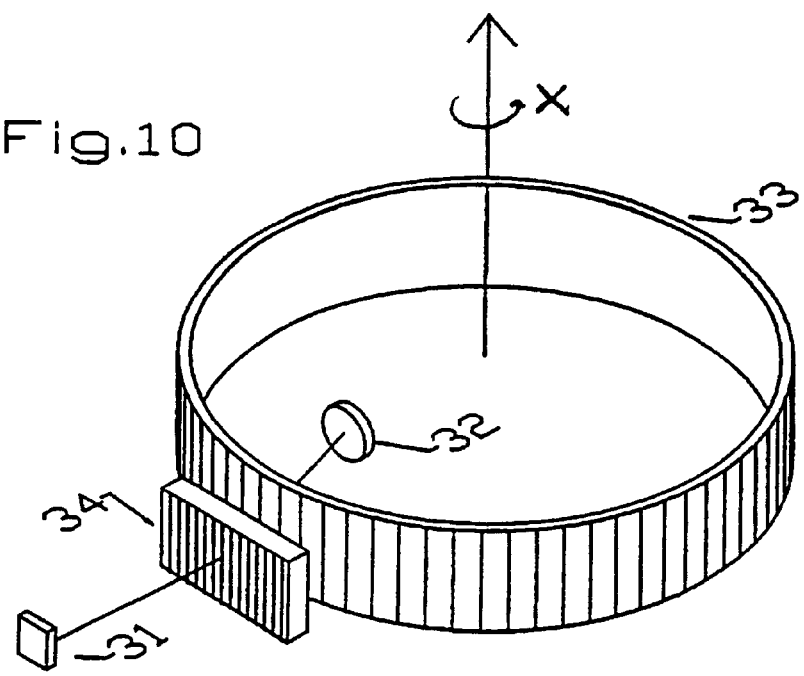
FIG. 10 is an illustration of a rotary optical encoder according to the present invention.
Figure 11:
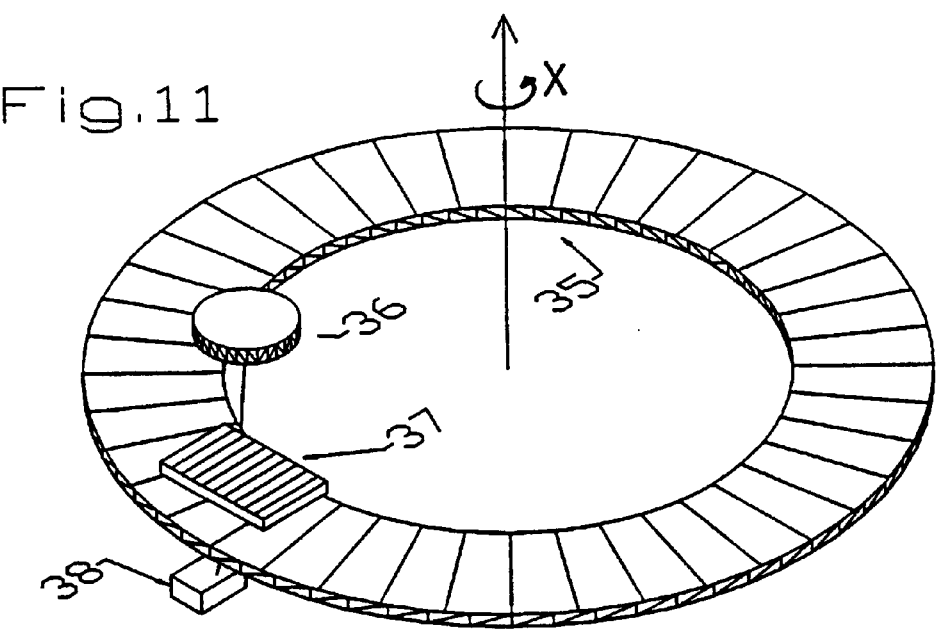
FIG. 11 is an illustration of a rotary optical encoder according to the present invention.

FIGS. 10 and 11 illustrate examples of a rotary encoder using the above-mentioned principle. The rotary encoder of FIG. 10 comprises the light source 32, a fixed array of lenslets 34, a rotatable array of lenslets 33 which is formed on a cylindrical surface and a light receiving element 31. The optical encoder of FIG. 11 comprises the light source 36, a fixed array of lenslets 37, a rotatable array of lenslets 35 which is formed on a plane circular surface and a light receiving element 38. The rotatable arrays of lenslets 33 and 35 both rotate about an axis X.

One of the greatest advantages of the present invention using the principle described above is in the application of two-dimensional optical encoder. Conventional two-dimensional optical encoders are made of a combination of two linear one-dimensional optical encoder positions at 90 degree from each other on the same plane surface. Such a design can lead to a more complex and bulky apparatus and ultimately can increase the cost of production or in some case impossible to miniaturize the apparatus. Thus a simple two-dimensional optical encoder as illustrates in FIG. 12 will overcome the above-mentioned limitations.

A detail description will now be given, with reference to FIG. 12, which illustrates the second embodiment of the present invention. The two-dimensional encoder comprises a light source 50, a first and second movable arrays of lenslets 51 and 52 which are placed on the top of each other forming a single layer two-dimensional lenslet array, a first and second fixed arrays of lenslets 48 and 49 and a light receiving elements 47 and 46. In the two-dimensional lenslets array, the longitudinal axis of the lenslets 56 of the array of lenslets 51 extend along the X axis and the longitudinal axis of the lenslets 58 of the array of lenslets 52 extend along the Y-axis. The fixed array of lenslets 48 and 49 are positioned substantially perpendicular to each other and parallel above the two-dimensional lenslet array. The beam of light is first incident on the two-dimensional lenslets array, which is defined by the individual lenslet 56 and 58, the exited light beam is then directed at the fixed array of lenslets 48 and 49. Each array of lenslet 48 and 49 will further defines the exiting light beam into two set dark and bright fringes. As the two-dimensional lenslet array is displaced parallel to the X axis, only the position of the dark and bright fringes that are generated by the fixed array of lenslets 48 will change, for only the angle of the incident light beam exiting from the two-dimensional lenslet array will change relative to surface 60 of the individual lenslets 61. Similarly, if the two dimensional lenslet array is displaced parallel to the Y axis, only the position of the dark and bright fringes that are generated by the fixed array of lenslets 49 will change position, for only the angle of the incident light beam exiting from the two dimensional lenslet array will change relative to the surface 62 of the individual lenslet 63. That is, by sensing the change in the position of the two sets of dark and bright fringes, the light receiving element 47 and 48 will generate a corresponding electrical signal, which can be used to determine the displacement of the two-dimensional lenslet array in the XY plane.

Figure 12:
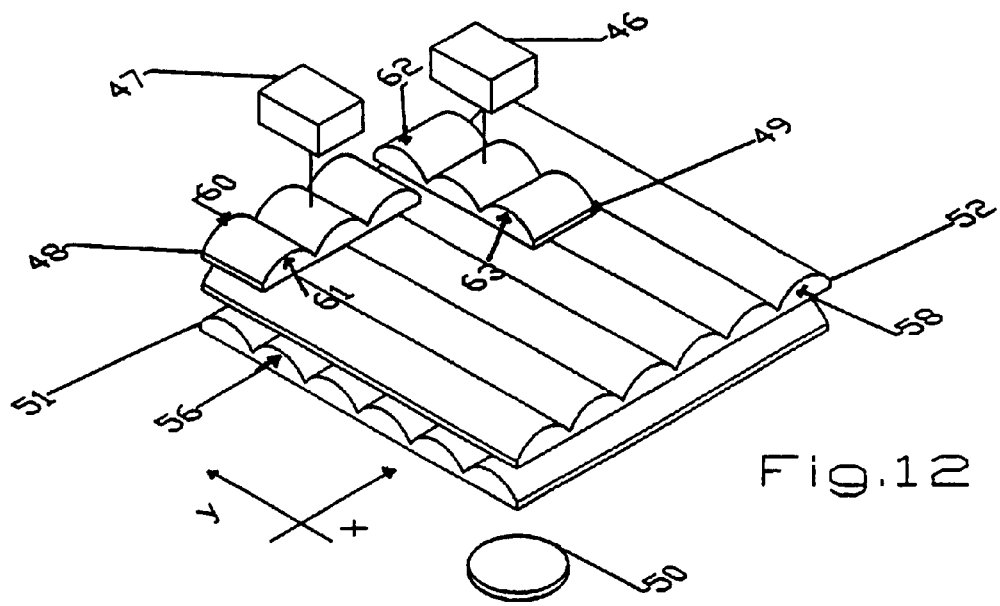
FIG. 12 is an illustration of a second embodiment of a two-dimensional optical encoder according to the present invention.
Figure 13:
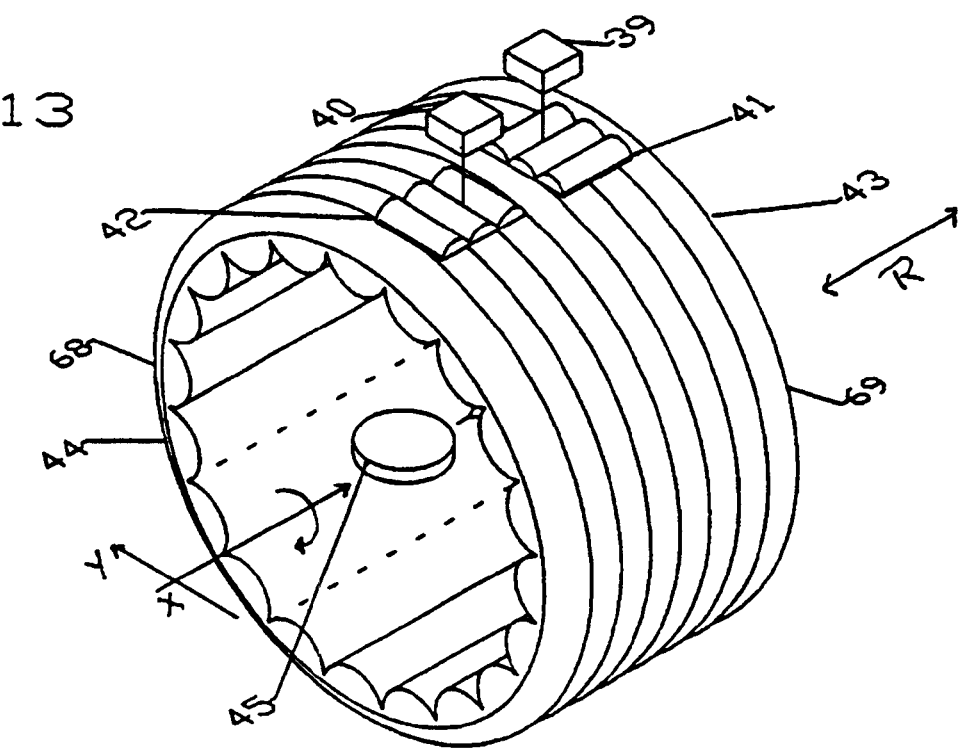
FIG. 13 is an illustration of a variation of a second embodiment of a two-dimensional optical encoder according to the present invention

FIG. 13 illustrates a two dimensional rotational optical encoder, which uses the same principle described for the second embodiment in FIG. 12. The two-dimensional rotational encoder comprises a light source 45, a first and second movable array of lenslet 43 and 44 which are formed on a cylindrical surface and inserted together forming a two layer cylindrical array of lenslets, and light receiving elements 39 and 40. The longitudinal axis of the lenslets 68 of the array of lenslets 44 extend circularly along the X axis and the longitudinal axis of the lenslet 69 of the array of lenslets 43 extend circularly along the Y axis. In order to generate a two-dimensional rotational encoder, the movable array of lenslets 44 and 43 rotate around the X-axis and is displaced along the direction provided by the arrow R.

Additionally, it is possible to create variations of the two-dimensional encoder illustrate in FIGS. 12 and 13 by simply omitting the fixed arrays of lenslets 48 and 49 from the embodiment in FIG. 12 and the fixed arrays of lenslets 44 and 43 from the embodiment in FIG. 13.

It should be noted that having fully described a preferred embodiment of the invention and various alternatives, those skilled in the art will recognize, given the teaching herein, that numerous alternatives and equivalent exist which do not depart from the scope of the invention. It is therefore intended that the invention not be limited by the foregoing description, but only by the claims.

Additionally, in the above-mention embodiments thereof having more than two arrays of lenslets, any one of the arrays of lenslets may be a movable array of lenslets while the other arrays are made to be fixed.

The embodiments of the invention in which an exclusive property or privilege is claimed are defined as follows:

1. A two dimensional optical encoder comprising:
    a light source emitting a light beam;
    a first and second array of lenslets to which said light beam emitted by said light source is directed through two substantially parallel arrays of lenslet with the lenslets of one of the array of lenslets is being oriented substantially perpendicular to the lenslets of the other array of lenslets;
    a third array of lenslets to which light beams exiting from first and second array of lenslets is directed, the third array of lenslets is arranged substantially parallel with the first and second array of lenslets, the lenslet of the third array of lenslets is being positioned substantially parallel to the lenslet of the first array of lenslets;
    a fourth array of lenslets to which light beams exiting from first and second array of lenslets is directed, the fourth array of lenslets is arranged substantially parallel with the first and second array of lenslets, the lenslet of the fourth array of lenslets is being positioned substantially parallel to the lenslets of the second array of lenslets;
    a first displacement information obtaining means for obtaining information on a displacement and a moving direction of one of said first or third array of lenslets, said information being obtained according to a combination of a twice-refracted beam at said third array of lenslets, said twice-refracted beam being generated from a refracted beam generated at said first array of lenslets, said information being obtained in accordance with dark or bright pattern formed by said twice-refracted beam; and
    a second displacement information obtaining means for obtaining information on a displacement and a moving direction of one of said second or fourth array of lenslets, said information being obtained according to a combination of a twice-refracted beam at said fourth array of lenslets, said twice-refracted beam being generated from a refracted beam generated at said second array of lenslets, said information being obtained in accordance with dark or bright pattern formed by said twice-refracted beam.

2. The optical encoder as claimed in claim 1, wherein said array of lenslets made of glass or clear synthetic plastic material being of substantially uniform thickness and pitch.

3. The optical encoder as claimed in claim 1, wherein said array of lenslets comprises of plurality of closely spaced elongated lenslets, each lenslets having a convex surface.

4. The optical encoder as claimed in claim 1, wherein said array of lenslets comprises of said plurality of closely spaced elongated lenslets, said each lenslets having a concave surface.

5. The optical encoder as claimed in claim 1, wherein said array of lenslets comprises of lenticular arrays.

6. The optical encoder as claimed in claim 1, wherein said lenticular sheet is a diffractive lenticular having a plurality of stripes of a transparent or opaque material on a surface of substrate with the stripes being arrayed in a pattern to diffract the beam.

7. The optical encoder as claimed in claim 1, wherein said lenticular sheet is an array of holograms to produce an array of image of the shape when the beam passes.

8. The optical encoder as claimed in claim 1, wherein said array of lenslets is coated with an optical intensification coating on both surfaces.

9. The optical encoder as claimed in claim 1, wherein said two of said first and second array of lenslets with array of lenslets position substantially perpendicular to each other is formed in a cylindrical shape so that said optical encoder forms a two dimensional rotary encoder.

10. The optical encoder as claimed in claim 9, wherein said lenticular sheet comprises of said plurality of closely spaced linear array of lenslets, said each lenslets having a convex surface on one surface of the lenticular sheet and the opposite surface is smooth.

11. The optical encoder as claimed in claim 9, wherein said lenticular sheet comprises of said plurality of closely spaced linear array of lenslets, said each lenslets having a concave surface.

12. The optical encoder as claimed in claim 9, wherein said lenticular sheet comprises of said plurality of closely spaced linear array of lenslets, said each lenslets is cylindrical.

13. The optical encoder as claimed in claim 9, wherein said lenticular sheet is a diffractive lenticular having a plurality of stripes of a transparent or opaque material on a surface of substrate with the stripes being arrayed in a pattern to diffract the beam.

14. The optical encoder as claimed in claim 9, wherein said lenticular sheet is an array of holograms to produce an array of image of the shape when the beam passes therethrough.

15. The optical encoder as claimed in claim 1, wherein said a first displacement information obtaining means for obtaining information on a displacement and a moving direction of one of said first or third array of lenslets, said information being obtained according to a combination of a twice-diffracted beam at said third array of lenslets, said twice-diffracted beam being generated from a diffracted beam generated at said first array of lenslets, said information being obtained in accordance with said changing pattern formed by said twice-diffracted beam; and
    a second displacement information obtaining means for obtaining information on a displacement and a moving direction of one of said second or fourth array of lenslets, said information being obtained according to a combination of a twice-diffracted beam at said fourth array of lenslets, said twice-diffracted beam being generated from a diffracted beam generated at said second array of lenslets, said information being obtained in accordance with said changing pattern formed by said twice-diffracted beam.

16. The optical encoder as claimed in claim 15, wherein said array of lenslets is a diffractive lenticular array having a plurality of stripes of a transparent or opaque material on a surface of glass, plastic or substrate with the stripes being arrayed in a pattern to diffract the beam.

17. The optical encoder as claimed in claim 15, wherein said array of lenslets is an array of holograms to produce an array of image of the desired pattern when the beam passes therethrough.

18. The optical encoder as claimed in claim 1, wherein said arrays of lenslets comprises of glass or synthetic plastic material being of substantially uniform thickness and non-uniform pitch.

19. An optical encoder comprising:

a light source emitting a light beam;

a first array of lenslets to which said light beam emitted by said light source is directed, said first array of lenslets having a uniform pitch;

a second array of lenslets of same pitch to which light beams exiting from said first array of lenslets is directed, said second array of lenslets having a uniform pitch, said the lenslets of the second array of lenslets is positioned parallel to the lenslets of the first array of lenslets; and a displacement information obtaining means for obtaining information on a displacement and a moving direction of one of said first or second array of lenslets, said information being obtained from a combination of a twice-refracted beams at the second array of lenslets which converges on a light detector, said light detector is positioned at a focus point of the twice-refracted beam which subtends the field of view of the array of lenslets, said twice-refracted beam being generated from a refracted beam generated at the first array of lenslets, said information being obtained in accordance with dark or bright pattern formed by the twice-refracted beam at the focus point.

20. The optical encoder as claimed in claim 19, wherein said first array of lenslets and second array of lenslets is formed in a cylindrical shape so that said optical encoder forms a rotary encoder.

21. The optical encoder as claimed in claim 19, wherein said array of lenslets is a lenticular sheet having plane surface and a convex surface.

* * * * *